United States Patent [19]

McCauley

[11] 4,118,807
[45] Oct. 10, 1978

[54] MINNOW DIPPER

[76] Inventor: Kenneth G. McCauley, 1162 Carbona Dr., Dallas, Tex. 75217

[21] Appl. No.: 830,407

[22] Filed: Sep. 6, 1977

[51] Int. Cl.² ............................................. A01K 97/04
[52] U.S. Cl. .............................................. 43/4; 43/55
[58] Field of Search ................... 43/4, 11, 12, 54.5 R, 43/55

[56] References Cited

U.S. PATENT DOCUMENTS

| 2,531,551 | 11/1950 | Brecht | 43/4 |
| 2,982,045 | 5/1961 | Highland | 43/11 |
| 3,059,369 | 10/1962 | Swanson | 43/4 |
| 3,308,570 | 3/1967 | Horton | 43/55 |

Primary Examiner—Nicholas P. Godici
Attorney, Agent, or Firm—Dennis T. Griggs

[57] ABSTRACT

A minnow dipper having a handle, a funnel portion and a tubular member defining a minnow receiving chamber is disclosed. An axially extending side opening is formed in the tubular member intermediate open and terminal end portions thereby defining a hooking zone which is sufficiently deep to permit hooking access to a minnow disposed in the chamber. A flexible sheath covers substantially all of the side opening exclusive of the hooking zone for restraining a minnow in the receiving chamber. A slit opening extends along the length of the sheath to permit manual withdrawal of the minnow. In a preferred embodiment, the flexible sheath comprises a portion of a tubular insert having a slit and a notched opening which in combination with the side opening defines the hooking zone.

3 Claims, 4 Drawing Figures

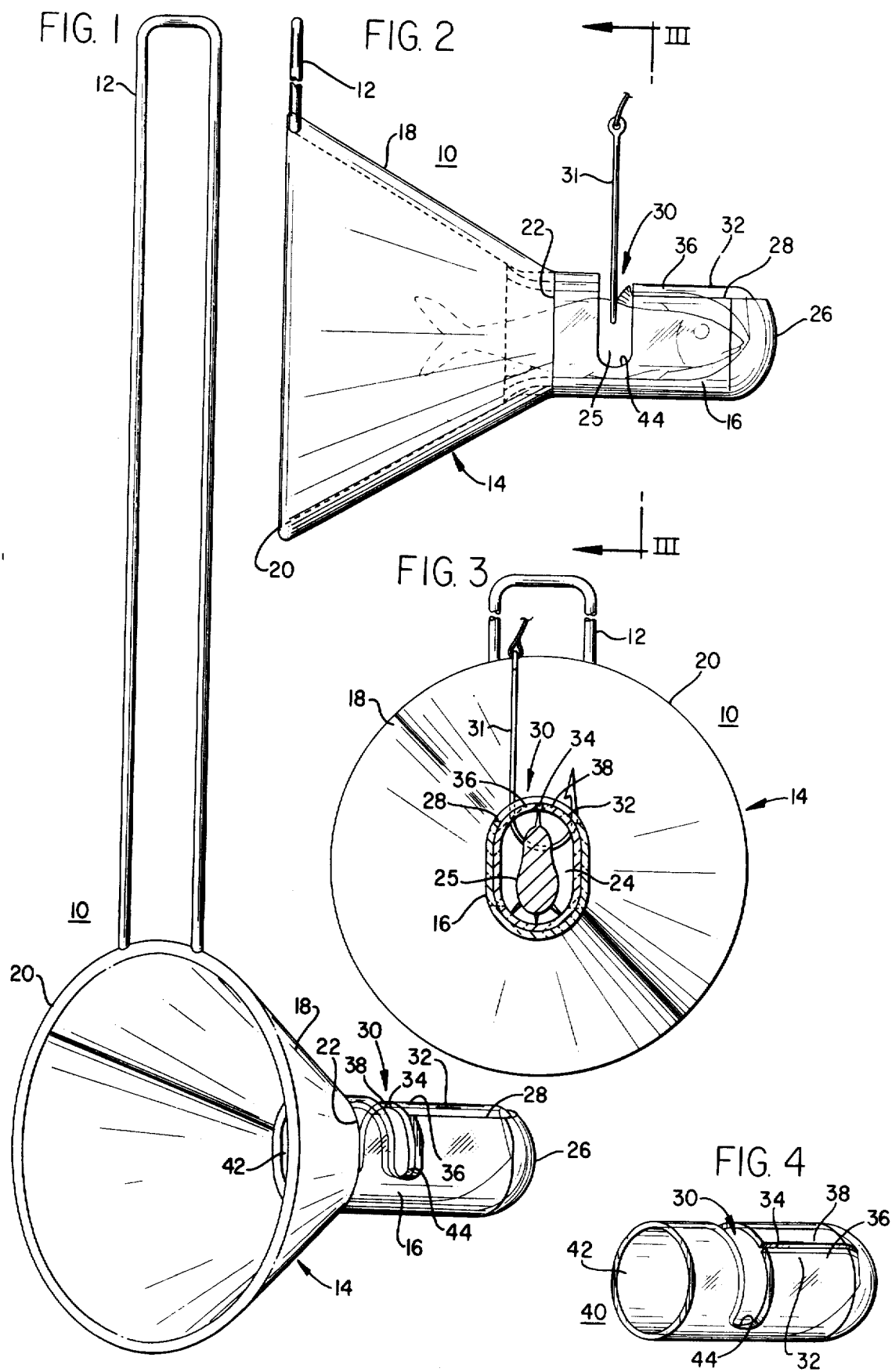

MINNOW DIPPER

BACKGROUND OF THE INVENTION

1. Field of the Invention

The present invention relates generally to accessory fishing tackle, and in particular to the construction of a minnow dipper for gathering a live minnow from a minnow bucket.

2. Description of the Prior Art

In freshwater sport fishing, game fish are caught on natural baits and on artificial lures. Some fishermen prefer live natural baits because natural baits have a familiar shape, movement or odor which appeal to freshwater game fish. Minnows are the principal natural food of many kinds of popular freshwater game fishes such as bass and crappie. Most of the many kinds of minnows used as live bait measure only a few inches in length and are kept in a live bait container such as a minnow bucket.

According to conventional practice, live minnows are retrieved from a minnow bucket by means of a small dip net or simply by inserting the hand into the bucket. Retrieving a minnow by hand is not preferred since the minnows remaining in the bucket may be contaminated by gasoline or oil which commonly soils the hands when fishing from a boat. Retrieving a minnow by means of a small dip net is an improvement since the water in the minnow bucket is not exposed to contaminants by the retrieval process. However, use of the conventional dip net is not entirely satisfactory since more than one minnow may be gathered by the net and some may escape while the fisherman is trying to hook a single minnow. In addition to the risk of losing some of the minnows gathered in the net, there is the risk of snagging the hook in the dip net while attempting to properly hook the minnow. According to a preferred method for hooking live minnows, the hook is inserted through the muscles of the back either forward of the dorsal fin or behind the dorsal through the tail. It is relatively difficult to carry out the preferred hooking method on a lively minnow while keeping the dip net clear of the hook and while also tending to the line, pole and other fishing gear.

SUMMARY OF THE INVENTION

According to the invention, a minnow dipper is provided for retrieving a live minnow from a minnow bucket which overcomes the disadvantages associated with the conventional dip net. The minnow dipper includes a handle, a funnel portion and a tubular member defining a minnow receiving chamber for temporarily restraining the minnow during the hooking procedure. An axially extending side opening is formed in the tubular member thereby defining a hooking zone which coincides with the dorsal area of a minnow restrained within the chamber. A flexible sheath covers substantially all of the side opening exclusive of the hooking zone and restrains the minnow in the receiving chamber. A slit opening extends along the length of the sheath to permit manual withdrawal of the minnow after the hooking procedure is completed. In a preferred embodiment, the flexible sheath comprises a portion of a tubular insert having a slit and a notched opening which in combination with the side opening defines the hooking zone. According to an important feature of the invention in yet another embodiment, the funnel portion of the dipper is opaque while the tubular member and sheath are clear or transparent. In this arrangement, the receiving chamber is illuminated relative to the funnel portion with ambient light so that the receiving chamber appears to be an escape opening to the minnow, thereby encouraging the minnow to enter.

The novel features which characterizes the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIG. 1 is a perspective view of a minnow dipper constructed according to the teachings of the invention;

FIG. 2 is a side elevation view of the minnow dipper of FIG. 1;

FIG. 3 is an elevation view, partly in section, taken along the lines III—III of FIG. 2; and, FIG. 4 is an isometric view of a removable resilient insert which is used with the minnow dipper of FIG. 1.

DETAILED DESCRIPTION OF THE PREFERRED EMBODIMENT

Referring now to the drawing, and in particular to FIG. 1, an improved minnow dipper 10 is illustrated. The dipper 10 includes a bail or handle 12, a funnel portion 14, and a tubular member 16. As can best be seen in FIG. 2, the funnel portion 14 is characterized by a tapered sidewall section 18 which converges from a relatively large diameter open end bounded by a rim 20 to a relatively small diameter open end which is indicated by the line 22 from which the tubular sidewall member 16 projects. The funnel portion 14 is preferably of injection molded plastic construction; however, other material such as aluminum may be used to good advantage. Polyethelene plastic fiberglass is particularly useful for this purpose.

The handle 12 is conventional in design and is preferably formed of corrosion resistant wire such as a length of twelve guage aluminum or stainless steel wire. The end portions (not shown) of the length of wire are preferably joined to the funnel portion 14 around the periphery of the rim 20 during the injection molding procedure. The handle 12 projects generally at a right angle with respect to the axis of the funnel 14.

According to an important feature of the invention, the tubular member 16 defines a minnow receiving chamber 24 as can best be seen in FIG. 3 of the drawing. The receiving chamber 24 is generally oval in cross section and approximates the physical outline of a minnow 25 (FIG. 2). The receiving chamber 24 has an axial length approximately equal to the length of a fishing minnow and is slightly larger in radial extent to permit the minnow 25 to enter the chamber 24 freely. The terminal end 26 of the tubular member 16 may include a small opening (not shown) to permit water to drain freely through the chamber 24 without allowing the minnow to escape the chamber. The opposite end of the tubular member 16 is completely open and is securely attached to the funnel portion 14 substantially in concentric relation with the relatively small diameter open end 22, thereby permitting the minnow 25 to swim through the funnel portion 14 into the receiving chamber 24.

Referring now to FIG. 2, the tubular member 16 and receiving chamber 24 cooperate to temporarily restrain the minnow 25 in a position which will permit the minnow to be hooked while virtually eliminating the risk that the minnow will escape or be inadvertently released. According to a preferred method for hooking live minnows, a hook 31 is inserted through the muscles of the back either forward of the dorsal fin at 27, or behind the dorsal through the tail at 29. To accommodate this preferred hooking method, a side opening 28 is formed in the tubular member 16 intermediate the open end and the terminal end 26 to expose the dorsal area while the minnow is restrained in the chamber 24. A region of the side opening 28 defines a hooking zone 30 which is sufficiently deep to expose the selected muscle area either forward or behind the dorsel fin to the point of the hook 31.

According to another important feature of the invention, a flexible sheath 32 partially obscures the side opening 28 to prevent the minnow 25 from jumping out of the chamber 24. A slit 34 is formed along the length of the sheath 32 to permit the minnow to be manually withdrawn from the receiving chamber 24 after the hooking procedure is accomplished. The slit 34 is bounded by opposite flaps 36, 38 which yield and radially deflect as the minnow is withdrawn.

The flexible sheath 32 preferably comprises a thin layer of a resilient material such as silicon epoxy compound. The sheath may be thermally or chemically bonded to the interior of the tubular member 16 if desired. However, according to a preferred embodiment of the invention, the flexible sheath 32 comprises an integral portion of a removable insert 40 as illustrated in FIG. 4 which can be removed from the chamber 24 and replaced with a larger or smaller insert to accommodate a minnow having relatively longer or shorter length. This arrangement is useful, for example, for accommodating minnows for bass fishing which are relatively larger than minnows which are typically used for crappie fishing. A number of such replaceable inserts 40 can be conveniently carried in a tackle box, or can be secured to the handle 12 for convenience.

The removable insert 40 has an outside diameter which provides a compressive union with the tubular member 16 when it is inserted therein. Its inside diameter is sufficiently large to freely admit the minnow 25. The insert 40 includes an open end 42 which is disposed substantially in concentric relation with the small diameter opening 22 of the funnel portion 14. The insert 40 also includes a notched opening 44 which in combination with the side opening 28 of the tubular member 16 defines the hooking zone 30.

As an inducement for the minnow 25 to enter the receiving chamber 24, the tapered side wall section 18 of the funnel portion 14 is opaque, and the tubular member 16, the sheath 32 and insert 40 are relatively transparent. The object of this arrangement is to illuminate the receiving chamber 24 relative to the funnel 14 with ambient light so that the receiving chamber appears to be an escape opening to the minnow, thereby encouraging the minnow to enter. In a preferred embodiment the funnel 14 is black and the remaining portions are clear.

Typical dimensions of the improved minnow dipper 10 will now be given which are representative of the preferred embodiment. These dimensions are given for purposes of illustration only, it being understood that other dimensions may be used to good advantage. The funnel portion 14 has a three inch diameter open end 20, with the small diameter end 22 being approximately one inch in diameter. The overall length of the funnel 14 and tubular member 16 is approximately five inches. The tubular member corresponds in length generally with the length of a crappie fishing minnow, approximately two inches. The tubular member 16 is oval in cross section, being approximately 1 inch in height and one-half inch in width. The slit 34 is approximately one-eighth inch width and about one and one-half inches long. The hooking zone 30 is approximately one-half inch in length and three-eighths inch in depth. The handle 12 is approximately 6 inches in length.

Although a preferred embodiment of the invention has been described in detail, it should be understood that various changes, substitutions, and alterations can be made therein without departing from the spirit and scope of the invention as defined by the appended claims.

What is claimed is:

1. A minnow dipper comprising, in combination:
    a funnel portion characterized by a tapered sidewall section converging from a relatively large diameter open end to a relatively small diameter open end;
    a handle attached to the funnel portion near the relatively large diameter open end;
    a tubular member defining a minnow receiving chamber having an open end portion attached to the funnel portion substantially in concentric relation with the small diameter open end, a terminal end portion projecting axially with respect to the funnel portion, and an axially extending side opening formed in the tubular member intermediate the open and terminal end portions, the side opening defining a hooking zone which is sufficiently deep to permit hooking access to a minnow disposed in the receiving chamber; and,
    a flexible sheath covering substantially all of the side opening exclusive of the hooking zone for restraining a minnow disposed in the receiving chamber, the flexible sheath having a slit opening extending along the length of the sheath to permit manual withdrawal of the minnow from the receiving chamber.

2. The minnow dipper as defined in claim 1 wherein the tapered sidewall section of the funnel portion includes at least an upper sidewall section which is opaque, the remaining tapered sidewall section and tubular section being relatively transparent.

3. The minnow dipper as defined in claim 1 wherein the flexible sheath comprises a portion of a tubular insert disposed within the receiving chamber, the tubular insert having an open end disposed in concentric relation with the small diameter end of the funnel portion, and having a notched opening which in combination with the side opening defining the hooking zone.

* * * * *